United States Patent Office 3,421,138
Patented Jan. 7, 1969

3,421,138
SEA NAVIGATIONAL SYSTEM FOR LOCATING A FLOATING INSTALLATION OR A SUBMARINE
Pierre Moulin, Montesson, Jean Pierre Barret, Marly-le-Roi, and Michel La Porte, Chatou, France, assignors to Institut Francaise du Petrole, des Carburants et Lubrifiants, Rueil-Malmaison, Hauts-de-Seine, France, a body corporate
Filed Nov. 1, 1966, Ser. No. 591,313
Claims priority, application France, Nov. 6, 1965, 37,578
U.S. Cl. 340—5          5 Claims
Int. Cl. H04b 13/00; H04b 13/02

ABSTRACT OF THE DISCLOSURE

A radio-acoustic ranging system for use at sea has an ultrasonic wave generator in a vessel and ultrasonic wave receivers located on the ocean floor. Each receiver may have a radio sender at the surface of the ocean. The time of emission of the ultrasonic waves is noted. The times of reception at the vessel of the characteristic radio wave of each receiver are noted. The respective distances between the vessel and the receivers at a determined instant can then be found.

---

The present invention relates to a radio-acoustic ranging system for use at sea, having an electromagnetic response to a signal by acoustic waves for determining position, with respect to navigational marks which are fixed in position, of a mobile installation such as a floating installation or a submarine.

For the purposes of the present invention, the expression "acoustic waves" means not only waves in the audible frequency range but also ultrasonic waves and infrasonic waves as well as shock waves and waves propagated by vibrations in water.

Radio-acoustic navigation systems for use at sea are known comprising a plurality of surface buoys known as "sonobuoys" each being equipped with an ultra-sonic receiver located under the floatation line of the buoy and a radio sender cooperating with this receiver for the propagation of electromagnetic surface waves echoing the reception of the ultra-sonic signals by the buoy receiver.

In such a system the determination of the position of a mobile installation such as a vessel, includes the emission in water from the vessel of ultra-sonic interrogation signals and the logging of the time of emission of each of these signals.

The ultra-sonic signal is received by the receiver in each of the sonobuoys and each of the buoys emits a response signal upon a space radiated electromagnetic carrier wave with each buoy having a characteristic signal as by frequency of the carrying wave. The different responsive signals corresponding to the same interrogation signal are received on the installation and their respective times of reception are logged. The respective distances between the installation and the different buoys at a determined instant can then be determined.

An inconvenience of such a system is found in the imprecise location of the position of each of the sonobuoys. Each of the buoys is connected by a cable to an anchor on the bottom of the sea and the buoys can move over the surface of the water within certain limits with the action of waves, winds or currents. This inaccuracy of location makes the system inadequate when the position of the mobile installation must be determined within very narrow limits as for drilling operations at sea from a floating installation.

The system of the present invention overcomes this difficulty and uses at least one ranging unit comprising a hydrophone connected to a mooring mass having a fixed position at the bottom of the sea or in the immediate neighborhood of the bottom and, in association with the hydrophone, an electromagnetic reply emitter on the surface mounted in a buoy connected to the hydrophone by a cable containing electric conductors.

The mobile installation whose position is to be determined, which may be a surface installation or a submarine, has an emitter of acoustic waves which are received by the hydrophone.

Upon reception of an acoustic pulse the hydrophone transmits to the associated surface emitter through the electric conductor an electric pulse controlling the surface emission of an electromagnetic response corresponding to the acoustic pulse. The response is received by a radio receiver on the surface at a measuring station. Logging the moment of reception of the response determines the distance separating the hydrophone from the emitter of acoustic waves. The time of emission of the acoustic pulse can be logged at the measuring station through connection by electric cable between the station and the acoustic wave emitter or by a radio connection between the measuring station and the mobile installation emitting the acoustic waves.

Logging the time of emission of the acoustic waves can be dispensed with by utilizing a plurality of at least three ranging units in accordance with the invention, and by logging the respective times of reception at the measuring station of the electromagnetic responses from these different units to the same acoustic pulse coming from the mobile installation, as will be discussed hereinafter. The measuring station equipped with radio reception may or may not be located upon the mobile installation, its position having no importance provided that it is proximate to the buoy units since the time of propagation of surface radio waves is negligible as compared to the time of travel of acoustic signals in water.

The system of the present invention has the following advantages:

The emission of acoustic waves is directed from the floating installation or submarine toward the bottom of the sea and not toward the surface. It is obviously more efficient to dispose the necessary source of energy for this emission at a place where the source of energy is readily available than to place it at the bottom of the sea in the form of batteries of limited power which are difficult to renew.

The emission takes place from a floating body such as a vessel or submarine where sufficient energy is available for the creation of an acceptable ratio between the acoustic pulse and the noise and the acoustic pulse is received in a quiet medium, the bottom of the sea, without re-emission of ultrasonic waves toward the noisy medium.

With an acoustic emission from the bottom of the sea toward the noisy medium, it would be difficult, in view of the limited power of a battery powered emitter on the bottom, to provide at the reception an acceptable ratio of the signal to the noise.

The reception of the acoustic signal occurring at the bottom of the sea the signal is not disturbed by parasitic reflections on the bottom as in the case of the detector being mounted in a buoy on the surface.

The emission of the responsive electromagnetic signal from a buoy on the surface provides for easy access to the emitter for renewal of the batteries powering the emitter or to modify the characteristics of the electromagnetic response for example to give it a coded form representative of the position of the hydrophone with which the electromagnetic emitter is associated.

In the system of the present invention, the location of the floating installation or of the submarine is determined not with respect to surface buoys of variable position due to currents and the like, but with respect to one or more hydrophones occupying fixed positions on the bottom of the sea or in the immediate vicinity of the bottom.

In the present system displacement of the surface buoy is without importance because the time of transmission of electromagnetic responses from the buoy to the measuring station added to that for transmission by electric conductors between the hydrophone and the buoy is always negligible with respect to the time of transmission of the acoustic impulses from the floating installation or submarine to the hydrophone. The time of transmission from the mobile installation to the hydrophone can then be accurately measured by the interval of time between the acoustic emission and the reception of the corresponding electromagnetic response. This reception can be effectuated by any measuring station which need not be the mobile installation using the respective times of reception of the measuring station is at not too great a distance from the buoy units, as previously discussed.

The measuring station could be located on the mobile installation itself or on a centrally located vessel in the case of a fleet of vessels and/or submarines and these could be connected by electric cable to the central vessel if it is desired to log at the measuring station the time of emission by each floating installation of an acoustic pulse but such a connection is not always indispensible if the method called "the differences" is used as described hereinafter.

The measuring station could also be fixed in position as in the case of a lighthouse or an aviation control tower which would receive from the different navigational units in accordance with the invention the radio responses corresponding to the emission of the same acoustic pulse by the mobile installation whose position is sought, the measuring station calculating the position of the mobile installation using the respective times of reception of the radio responses and communicating by radio the position of the mobile installation.

A preferred embodiment of the system of the present invention relates to the installation at seat of separate navigational units each comprising a surface buoy having a radio emitter and a submerged hydrophone connected to the buoy by a cable. The exact position of each submerged hydrophone can be determined by any appropriate known means after it has been submerged and the surface radio emitter adjusted so that it will emit coded impulses of characteristic form for the geographic position of the hydrophone.

A second important use of the system of the present invention has for an object the precise beaconing of a channel by mounting buoy units in accordance with the invention along each bank of the channel.

Two lines of hydrophones are thus formed with two lines of associated surface buoys.

Each of the surface emitters emits its electromagnetic response in accordance with a code which is appropriate to it and characteristic of the position of the associated hydrophone. Identical electromagnetic responses could also be emitted from buoys situated on one side of the channel with the buoys on the other side emitting a different type of response.

Another application of the present invention relates to the location of the respecive positions of various floating installations and/or submarines by a measuring station such as a central vessel utilizing several ranging units in accordance with the present invention. In this case it is necessary for the acoustic pulses to be emitted in a sequential manner from the floating installation or installations or from the submarine or submarines at regular intervals. The electromagnetic responses will then be received at the logging station and will indicate successively the respective positions of the vessels and/or of the submarines.

A very important embodiment of the system of the present invention is in its utilization in combination with a system for automatic dynamic positioning of a mobile installation. This embodiment will be described more particularly hereinafter primarily as utilizing ultrasonic waves as the acoustic waves but it should be understood that this embodiment is in no way limited thereto nor should this embodiment be construed as limiting the invention.

It is known that a method for dynamic positioning of a mobile installation consists in immobilizing this installaton at a given point on the surface of the water by the action of at least two propelling units capable of exerting a resultant force and a resulting couple of regulatable intensity and orientation.

Such a system for automatic dynamic positioning comprises means for determining as electric signals the distance between the position of the mobile installation at a given instant and the position chosen for this installaton, an electronic assembly called a "calculator" to provide values based on these signals on the position, for the direction and/or the intensity of the thrusts to be exerted by the propelling units to move the floating installation to the chosen position and means for controlling the orientation and/or the intensity of the thrusts of these units by the values furnished by the calculator.

The electric signals representing the deviation of the position of the mobile installation at a given instant from the chosen position are constituted by an electric voltage proportional to the difference between the measured heading of the installation and the chosen heading and by two electric voltages representing the coordinates $x$, $y$ in a system of axes $x0y$ associated with the floating installation, of a point of reference on the bottom of the sea.

In accordance with the present invention, it is possible to obtain an automatic dynamic anchorage system for a mobile installation in which the means for determining the position of the installation comprise in combination;

(a) Apparatus for the emission in water from the mobile installation of short duration acoustic pulses, (b) A plurality of hydrophones including acoustic impulse receivers attached to anchors located on the bottom of the sea or in the immediate neighborhood of the bottom producing an electric impulse on reception of each acoustic impulse emitted by the mobile installation, with each hydrophone being associated with a surface electromagnetic emitter which emitter is mounted in a buoy connected to its hydrophone by a cable containing electric conductors with transmission from this emitter of electric impulses produced by the associated hydrophone. Each electromagnetic emitter is associated with means for controlling the response by the electric pulses produced by the associated hydrophone and transmitted by the conductors. The surface emission of an electromagnetic response by each emitter is thus controlled by the electric impulse transmitted from the associated hydrophone upon reception by the hydrophone of the acoustic impulse to which the given electromagnetic response corresponds.

(c) Receiving apparatus for the electromagnetic responses situated on the mobile installation and comprising a discriminator for the responses coming from the several surface electromagnetic emitters.

(d) The apparatus for the emission of the acoustic impulses and the receiving apparatus for the corresponding electromagnetic responses are associated on the mobile installation with means determining the horizontal coordinates X, Y with respect to a system of absolute geographical axes associated with the hydrophones on the bottom of the sea, of the point of the mobile installation occupied by the emitter of the acoustic impulses, as a function of the time of reception on the installation of the electromagnetic responses emitted by the different surface emitters corresponding to the same acoustic pulse coming from the mobile installation; and (e) Apparatus of known type for transforming the coordinates X, Y to coordinates x, y with respect to a system of axes associated with the mobile installation.

The present invention will be described in detail hereinafter, more especially in the context of its application to automatic dynamic positioning, with reference to the accompanying drawings in which.

Figure 1:
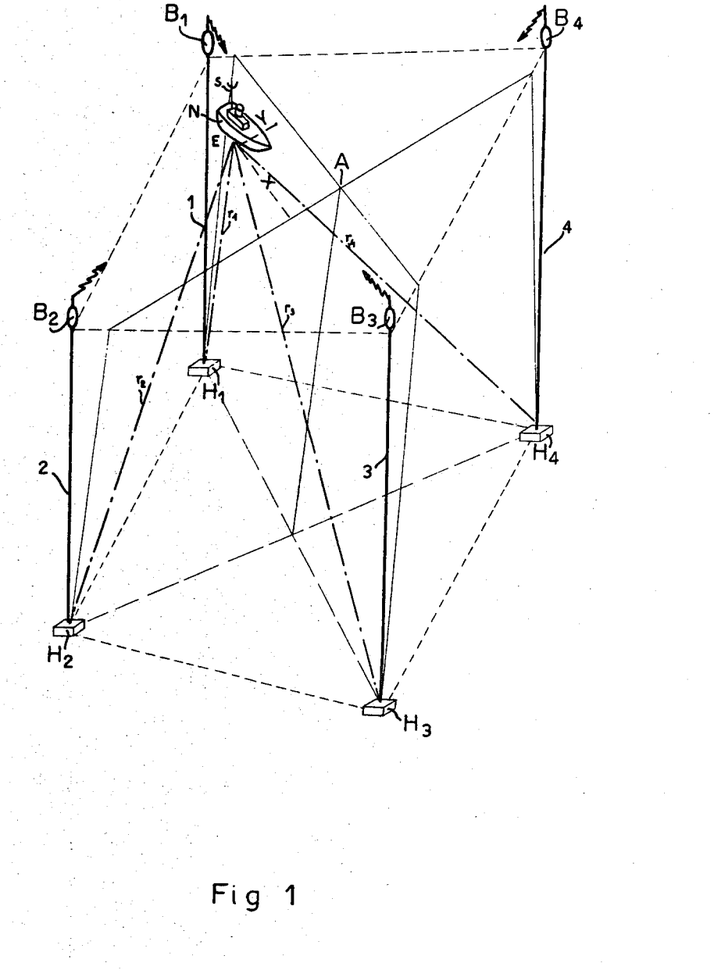
FIG. 1 illustrates a first embodiment of the invention.

In the embodiment of FIG. 1 four hydrophones $H_1$, $H_2$, $H_3$ and $H_4$ are located at the bottom of the sea.

These hydrophones are maintained in position by anchors which in this example are placed substantially at the apieces of a square.

Surface buoys $B_1$, $B_2$, $B_3$ and $B_4$ are associated respectively, with each of these hydrophones and each is connected to the associated hydrophone by a cable 1, 2, 3 or 4 containing electric conductors connecting the hydrophones to a radio emitter incorporated in the buoy. The frequency band of these hydrophones is adapted to that of the particular emitter employed on the mobile installation N.

A floating installation or vessel N includes an ultrasonic emitter E (Sonar) which emits at rectangular intervals, for example one second, ultra-sonic pulses of short duration of, for example, one millisecond.

In one form of the present invention there may be used as source of acoustic waves a spark discharge generator of pulses of the type described in U.S. Patent No. 3,227,996 to Hayward et al.

Each of these impulses is received by all of the hydrophones $H_1$, $H_2$, $H_3$ and $H_4$ and each transmits to the associated buoy upon reception of the ultra-sonic impulse, an electric impulse through the cable connecting the hydrophone to the buoy.

The reception of this impulse at the buoy controls, in known manner, the emission by the radio emitter of the buoy of a surface electromagnetic response on a characteristic carrying frequency for a given buoy.

This response is propagated in the air to vessel N where it is received by the antenna S and sent to a radio receiver after passing through a known type discriminator identifying the hydrophone and buoy with which the impulse corresponds in accordance with the carrying frequency of the impulse. In this embodiment, the measuring station is thus located on the vessel itself.

If $T_1$, $T_2$, $T_3$ and $T_4$ designate the intervals of time separating the emission of an ultra-sonic impulse from the vessel and the instant of reception respectively at the four hydrophones of the corresponding electromagnetic response emitted from the buoy associated therewith and if: $r_1=EH_1$, $r_2=EH_2$, $r_3=EH_3$, $r_4=EH_4$ then: $r_1=cT_1$, $r_2=cT_2$, $r_3=cT_3$, $r_4=cT_4$ where $c$ is the velocity of propagation of the ultra-sounds in water.

The speed of propagation of the electric impulses in cables 1, 2, 3 and 4 and the speed of propagation on the surface of the electromagnetic responses being very great as compared to the speed of propagation in water of the ultrasonic waves, it can be considered that the electromagnetic responses corresponding to an ultra-sonic impulse are received on the floating installation as soon as the ultra-sonic impluse is received by the several hydrophones.

In accordance with an embodiment, the differences or "delays" are determined as:

$$\Delta T_x = T_1 - T_3$$

and $$\Delta T_y = T_2 - T_4$$

Calculation shows that if $r_1-r_3$ is much less than $H_1H_3$ and $r_2-r_4$ is much less than $H_2H_4$ then:

$$X = K\Delta T_x$$
$$Y = K'\Delta T_y$$

where X and Y are the distances measured algebraically between the emitter E of the vessel and the mediatory or symmetry planes, (perpendicular bissector planes) respectively, of the segments $H_1H_3$ and $H_2H_4$, X and Y being less than their limiting maximum values which are small compared to the depth of the water.

The coefficients K and K' are, respectively, equal to:

$$K = \frac{c}{2}\sqrt{\frac{h^2}{a^2}+1}$$

$$K' = \frac{c}{2}\sqrt{\frac{h^2}{b^2}+1}$$

where $h$ is the depth of the water and $a=H_1H_3/2$; $b=H_2H_4/2$ (in the case where $H_1H_2H_3H_4$ is a square, $a=b$ and $K=K'$).

In the case where $H_1H_2H_3H_4$ is not an exact square, the symmetry planes of $H_1H_3$ and $H_2H_4$ are not necessarily perpendicular but even in this case the measure of $\Delta T_x$ and $\Delta T_y$ provides a system of coordinates (X, Y) for point E.

Further, if the medial planes of $H_1H_3$ and $H_2H_4$, respectively, are not perpendicular, it is possible, knowing the angle $\omega$ between them to determine very simply from coordinates X and Y of E in the system of planes, the coordinates X' and Y' of point E in the system of rectangular planes that constitute the bisecting planes of the first system of coordinate planes.

The formulas for change of axis are:

$$X' = \frac{X+Y}{2\sin\omega}$$

$$Y' = \frac{X-X}{2\cos\omega}$$

The preceding method called "the differences" obviates the requirement for logging of the time of emission of the ultransonic impulse since:

$$\Delta T_x = T_1 - T_3 = t_1 - t_3$$
$$\Delta T_y = T_2 - T_4 = t_2 - t_4$$

Where $t_1$, $t_2$, $t_3$ and $t_4$ are the respective times of reception at the measuring station of the radio responses corresponding to the emission of the same ultra-sonic impulse.

In another embodiment, the following differences are determined $$(T_1)^2 - (T_3)^2 \text{ and } (T_2)^2 - (T_4)^2$$

and the coordinates X and Y of E are determined in the system of symmetry planes of $H_1H_3$ and $H_2H_4$, respectively, by the relationships:

$$X = \frac{c^2(T_1^2 - T_3^2)}{4a} \quad Y = \frac{c^2(T_2^2 - T_4^2)}{4b}$$

where $a$ and $b$ have the values indicated above.

The second embodiment is particularly appropriate to the case already discussed where it is desired to know, with reference to a system of a plurality of ranging units in accordance with the invention, the position of a submarine connected to a surface installation and that of the installation itself by a emitting alternatively ultrasonic impulses from the surface installation and from the submarine and receiving at the surface installation the different responsive impulses transmitted by electromagnetic wave. Use of the formulas above do not require knowledge of the depth of water under the surface installation or under the submarine.

In a particular embodiment of the invention at least three navigational units are used in which the hydrophones are submerged on the bottom of the sea at points which are not aligned and proximate to the point above which the floating installation is to be maintained.

The times $T_{o1}$, $T_{o2}$, $T_{o3}$ ... $T_{oi}$, etc., are measured for the ultra-sonic impulse to reach the different hydrophones (the indices 1, 2, 3 ... i etc. corresponding to the different hydrophones $H_1$, $H_2$ ... $H_i$ etc.) when the vessel occupies a known reference position designated by $N_o$.

When the vessel leaves the position $N_0$ and moves to a position N, the times of response of value $T_{o1}$, $T_{o2}$ ... $T_{oi}$ become, respectively, $T_1$, $T_2$ ... $T_i$. If the coordinates of point N are X, Y, with reference to a fixed arbitrary system of axes in which $N_0$ is the origin then, if the displacement $N_0N$ of the vessel is less than a maximum value which is a function of the geometric disposition of the hydrophones and of the position of point $N_o$, it can be shown that the coordinates X, Y of point N are linear functions of:

$$\Delta T_i = T_i - T_{0i}$$

$$X = \sum_{i=1}^{n} \lambda i (T_i - T_{0i})$$

$$Y = \sum_{i=1}^{n} \mu i (T_i - T_{0i})$$

$n$ being the number of hydrophones and $\lambda_1$ and $\mu_1$ coefficients which depend on the geometric disposition of the hydrophones and of point $N_o$.

The measure at a given time of the differences $\Delta T_i$ then gives, when the various coefficients $\lambda_i$ and $\mu_i$ are known, a determination of the coordinates X and Y of the vessel on the condition, as already noted above, that the displacement $NN_0$ of the vessel is small.

The determination of the coefficients $\lambda_i$ and $\mu_i$ can be obtained by measurements followed by appropriate calculations and without it being necessary to know in precise manner the location of the hydrophones. For example $(\Delta T_i)_n$ are measured corresponding to the displacement $N_0N_n$, $N_n$ being situated to the north of $N_o$ and at a known distance therefrom and $(\Delta T_i)_e$ are measured corresponding to a displacement $N_0N_e$, $N_e$ to the east of $N_o$ and at a known distance therefrom. The displacements $N_0N_n$ and $N_0N_e$ being as large as possible but less than the maximum value discussed above. $\lambda_1$ and $\mu_1$ are non-linear expressions of $(\Delta T_i)_n$ and $(\Delta T_i)_e$.

Figure 2:
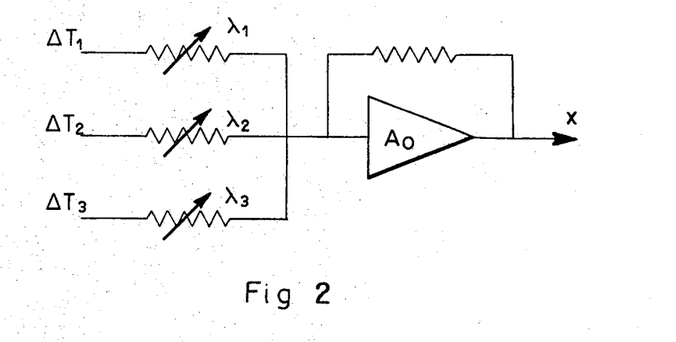
FIG. 2 discloses a second embodiment of the invention.

It is seen in FIG. 2 that in this embodiment of the invention where three navigational units are utilized a very simple calculator provides the abscissa X of the vessel in a system of fixed coordinate axes knowing $\Delta T_1$, $\Delta T_2$, $\Delta T_3$:

$$X = \lambda_1 \Delta T_1 + \lambda_2 \Delta T_2 + \lambda_3 \Delta T_3$$

$A_o$ is an operational amplifier and the coefficient $\lambda_1$, $\lambda_2$, $\lambda_3$ are adjusted by means of adjustable resistance as shown.

Figure 3:
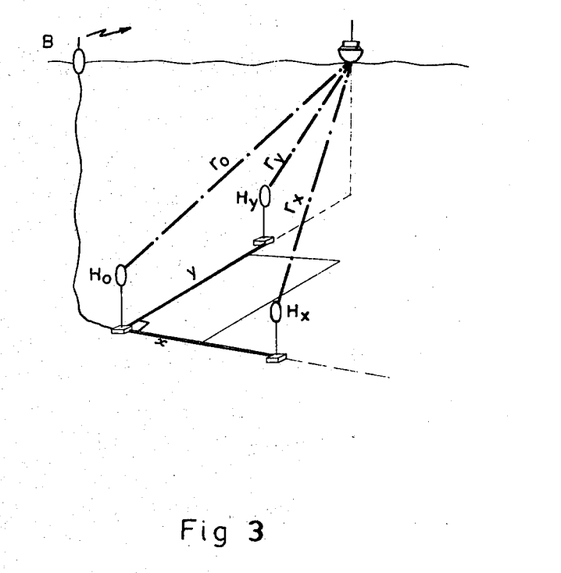
FIG. 3 relates to an embodiment of the present invention in which the hydrophones are disposed on a rigid base.

In accordance with the embodiment of the invention of FIG. 3, a rigid frame is disposed on the bottom of the sea to which the three hydrophones $H_o$, $H_x$, $H_y$ are attached and disposed respectively at the summits of an isoceles right triangle in which the side of the right angle has a length $d$ defining a system of rectangular coordinates having a summit $H_o$.

These three hydrophones are electrically connected by a cable to a surface buoy B having three radio emitters each having a characteristic frequency of the associated hydrophone.

In accordance with the invention, the determination of the times of passage $T_o$, $T_x$, $T_y$ of the ultrasonic impulses between the vessel and the hydrophones by measurement on the vessel of the time intervals separating the emission of an ultrasonic impulse and the respective times of reception of the three electromagnetic responses emanating from the three radio emitters of the buoy provides the coordinates X and Y of the vessel in the system of axes discussed above or, more accurately, those of the projection of the vessel on the plane of these axes.

The formulae utilized are:

$$X = \frac{c^2(T_o^2 - T_x^2)}{2d}$$

$$Y = \frac{c^2(T_o^2 - T_y^2)}{2d}$$

A preferred embodiment for carrying out the present invention will now be described with reference to FIGS. 1, 4 and 5 without, however, limiting the scope of the invention.

Figure 4:
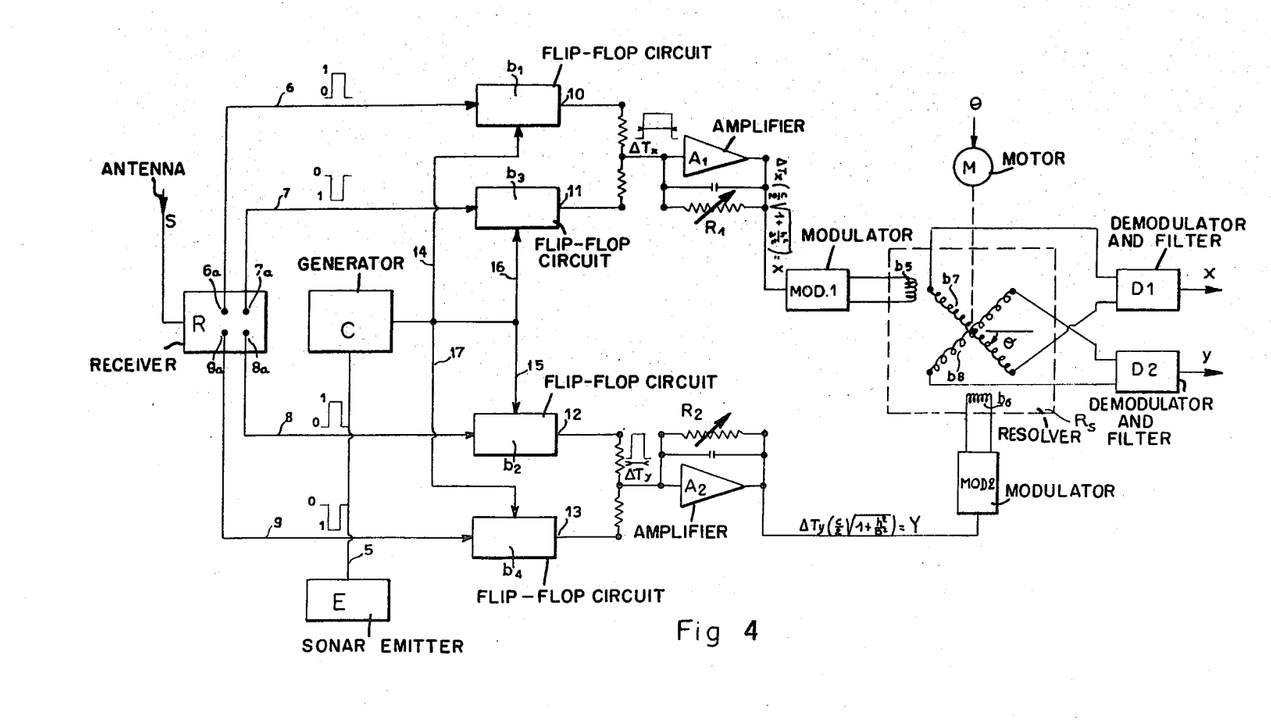
FIG. 4 is a schematic showing of electric circuits for the floating installation for use with the embodiment of FIG. 1 in a dynamic automatic positioning system.
Figure 5:
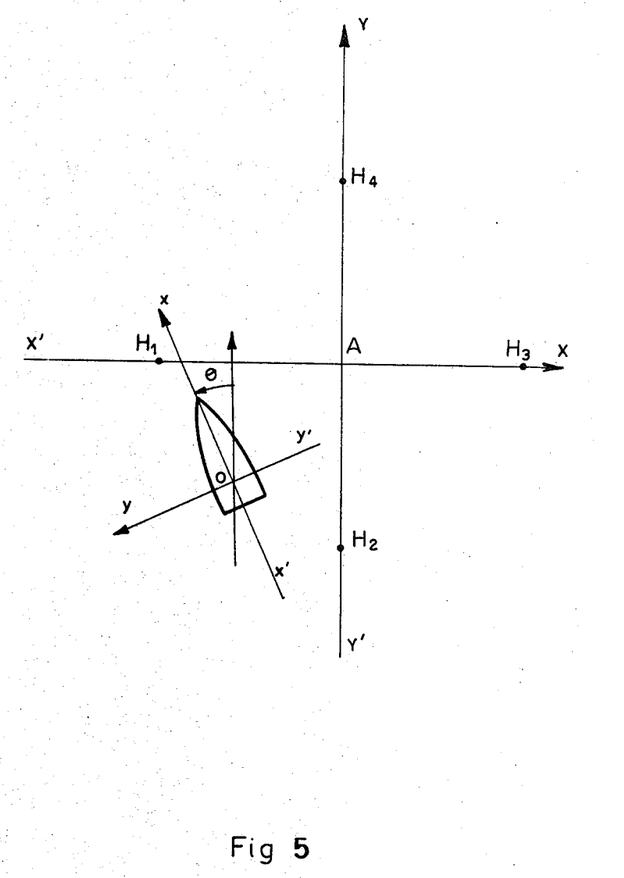
FIG. 5 illustrates the change of coordinates to relate the values provided by the system of the present invention with a system of axes associated with the floating installation.

FIG. 4 illustrates schematically the apparatus on the floating installation in an application of the present invention to automatic dynamic positioning, using the first embodiment of the invention described above with reference to FIG. 1 where four hydrophones $H_1$, $H_2$, $H_3$ and $H_4$ are located substantially at the summit of a square:

$$H_1H_3 = 2a$$

$$H_2H_4 = 2b$$

and, approximately, $b=a$.

A generator C, provided with conventional control means, emits, through conductor 5 into the water at regular intervals, ultra-sonic impulses of short length on the order of about a millisecond.

Upon emission of an ultra-sonic impulse, generator C controls, through conductors 14, 15, 16, 17, the return to zero of four identical flip-flop circuits $b_1$, $b_2$, $b_3$, $b_4$.

Reception by the hydrophones $H_1$, $H_2$, $H_3$, $H_4$ of the ultra-sonic impulse controls the emission from the radio emitters incorporated in the buoy $B_1$, $B_2$, $B_3$, $B_4$ (FIG. 1) of corresponding electromagnetic response signals which will be assumed as constituted by impulses $I_1$, $I_2$, $I_3$, $I_4$ modulating the respective carrying frequencies, each being characteristic of the associated couple hydrophone-buoy.

These impulses are received on the floating installation by the antenna S and a receiving apparatus R including a discriminator for the different carrying frequencies.

The arrival at the receiving apparatus R of the front of the impulse $I_1$ is translated, in known manner, into a positive rectangular impulse appearing at pole 6a of the receiving apparatus. This positive impulse is transmitted by conductor 6 and acts on flip flop circuit $b_1$ which delivers a positive rectangular wave until returned to zero by generator C.

The arrival of the front of pulse $I_3$ is changed into a rectangular negative wave apearing at pole 7a and having the same peak voltage as that appearing at 6a upon reception of $I_1$.

This negative wave is transmitted by conductor 7 to flip flop $b_3$ which delivers a negative rectangular wave of the same height as that leaving $b_1$ until return to zero of $b_3$ by generator C.

In an analogous manner the arrival of the front of pulse $I_2$ is changed into a rectangular positive wave appearing at pole 8a of R which is transmitted by conductor 8 to flip flop $b_2$ producing a positive rectangular wave and reception of the front of $I_4$ is transferred into a rectangular negative wave the peak voltage of which has the same absolute value as that of the preceding rectangular wave. This negative wave appears at pole 9a of R and is transmitted by conductor 9 to flip flop $b_4$ which produces a corresponding negative rectangular wave.

In these conditions, if poles 10 and 11 of flip flops $b_1$ and $b_3$ are connected, the waves produced by them combine and produce a resulting wave positive, zero or negative according to whether $I_1$ arrives first, at the same time or after $I_3$ and the length of which is proportional to the interval of time $\Delta T_x$ separating the arrival of the front of the pulse $I_1$ and that of the front of the pulse $I_3$.

This resulting rectangular wave is introduced into an amplifier $A_1$ which delivers a voltage proportional to the product of the length of the wave representing the time difference $\Delta T_x$ by a weighting coefficient $p_1$, supplied by variable resistance $R_1$, and having the value:

$$p_1 \frac{c}{2} = \sqrt{\frac{h^2}{a^2}+1}$$

where $a$ represents the distance $H_1H_3/2$, $h$ the depth of water and $c$ the velocity of propagation in water of the ultra-sonic waves.

In analogous manner when the poles 12 and 13 of flip flops $b_2$ and $b_4$ are connected, a rectangular wave is obtained having a length proportional to the time interval $\Delta T_y$ separating the the arrival of the front of pulse $I_2$ and that of the front of the pulse $I_4$.

This wave is introduced into amplifier $A_2$ which delivers a voltage proportional to the product of the length of this rectangular wave (representing the time period $\Delta T_y$) and a weighting coefficient $p_2$ supplied by variable resistance $R_2$, and having the value:

$$p_2 = \frac{c}{2}\sqrt{\frac{h^2}{b^2}+1}$$

where $$b = \frac{H_2H_4}{2} \simeq a$$

The voltages provided by amplifiers $A_1$ and $A_2$, respectively, are therefore proportional to the coordinates X and Y of the vessel or, more exactly, of the reference point 0 on the vertical of which is located the emitter E of the ultrasonic pulses in the fixed coordinate system of symmetry planes of the segments $H_1H_3$ and $H_2H_4$ (FIG. 1).

The absolute coordinates X, Y of the floating installation in a system of fixed planes can be transferred into relative coordinates $x$, $y$ for the selected immobilization point, in a mobile system of horizontal rectangular axes, associated with the floating installation, passing through the reference point 0 thereof which is assumed to be its center of gravity.

Voltages respectively proportional to $x$ and $y$ can be obtained from those proportional to X and Y delivered by amplifiers $A_1$ and $A_2$ by utilizing a coordinate transformer or "resolver" of known type shown at $R_s$ (FIG. 4).

It will be assumed, for purposes of simplification, that the four hydrophones $H_1$, $H_2$, $H_3$, $H_4$ have been so located that the surfaces of the symmetry planes of $H_1H_3$ and $H_2H_4$, respectively, intersect at the selected immobilization point A and that, further, $H_2H_4$ is oriented in the north-south direction.

The formulae for changing the axes for passing from coordinates X, Y to coordinates $x$, $y$ are:

$$x = -X \sin \theta + Y \cos \theta$$
$$y = -X \cos \theta - Y \sin \theta$$

where $\theta$ is the heading of the floating installation.

When the hydrophones $H_1$, $H_2$, $H_3$, $H_4$ are so located that the line of intersection of the symmetry planes of the diagonals $H_1H_3$, $H_2H_4$ is not vertical, a correction must be applied considering the inclination of this line with respect to the vertical during the change of coordinates.

In the showing of FIG. 4 the voltages leaving amplifiers $A_1$ and $A_2$ modulate an alternating current in modulators MOD 1, and MOD 2, respectively, and the modulated currents are applied to the perpendicular stator windings $b_5$ and $b_6$ of the "resolver" $R_s$.

The angular position of the stator is adjusted to the heading $\theta$ of the floating installation of motor M controlled for example by a gyrocompass.

The alternating voltages appearing at the poles of the two perpendicular rotary windings $b_7$ and $b_8$, provide, after passing through demodulation and filtering assemblies $D_1$ and $D_2$ continuous voltages respectively proportional to the coordinate $x$ and $y$. These last voltages are used directly in the electronic calculator of the dynamic positioning system.

Changes in or modifications to the above-described illustrative embodiments of the present invention may now be suggested to those skilled in the art without departing from the present inventive concept. Reference should therefore be had to the appended claims to determine the scope of this invention.

What we claim is:

1. A system for the radio-acoustic location at sea of a mobile installation by a measuring station, having four submerged ranging units including four devices for receiving acoustic signals sent through the water from the mobile installation and at least an aerial emission apparatus on the surface of the water for electromagnetic response signals corresponding to the acoustic signals received by said devices, said response signals being emitted upon reception of the acoustic signals, and a radio receiver for the response signals at the measuring station, said devices for reception of the acoustic signals being each in substantially stationary location with respect to the bottom of the sea and being electrically connected with said emission apparatus on the surface, said four devices being substantially located at the respective apices of a square on the bottom of the sea, said emission apparatus emitting a response signal characteristic for each device receiving acoustic signals, said mobile installation including means for emitting into the water, at regular intervals, acoustic signal impulses of short length, four electronic flip-flops each corresponding to one of said four ranging units, and having two input terminals with one of said input terminals connected to said acoustic impulse emission means for simultaneously returning to zero all of said flip-flops upon emission of an acoustic impulse, a discriminator connected to said radio receiver for the response signals having four output terminals, each of said output terminals corresponding to one of said ranging units and being connected to the second input terminal of the corresponding one of said electronic flip-flops, said discriminator producing an impulse at each of its output terminals in response to the reception at said receiver of a response signal from one of said ranging units corresponding to that output terminal, the impulses thus produced on the output terminal of a pair of said terminals of said receiver corresponding to two of said ranging units disposed at the extremities of a diagonal of the square being of opposite polarity, and two operational amplifiers the output terminals of the flip-flops which are connected to the output terminals of a pair of terminals of the receiver being interconnected and respectively connected to said two operational amplifiers having substantially a gain of $$c/2\sqrt{h^2/a^2+1}$$

where $h$ is the depth of the water, $a$ the half diagonal of the square and $c$ the speed of propagation in water of the acoustic waves, said two amplifiers which are connected to two pairs of terminals, providing electric output voltages representing respectively the two coordinates of the mobile installation in the system formed by the symmetry planes of the diagonals of the square.

2. A system as described in claim 1, wherein said ranging units are disposed in two predetermined directions at right angles, said mobile installation including means for measuring the heading of said mobile installation and a coordinate transformer including two stator coils at right angles connected to said two amplifiers, receiving the output voltages of said amplifiers, respectively, and a rotor controlled by the heading of the mobile installation with respect to one of the chosen directions, said rotor comprising two rotary coils at right angles, between the poles of which are respectively collected two voltages respectively proportional to the coordinates, in a system of axes associated with the mobile installation, of the point on the plane of these two axes of the line of intersection of said symmetry planes.

3. A method for the radio-acoustic location at sea of a mobile installation by a measuring station with respect to two stationary reference planes, by means of at least three submerged means for receiving acoustic signals, having substantially fixed locations with respect to the seabed and means, electrically connected with said receiver means, for transmitting electromagnetic signals in response to the reception of said acoustic signals by said receiver means, wherein a first of said reference planes is the symmetry plane of a first pair of said submerged means and the second of said reference planes is the symmetry plane of a second pair of said submerged means, said method comprising the steps of transmitting an acoustic signal from said mobile installation, receiving said acoustic signal at said receiver means, transmitting electromagnetic signals from said transmitting means in response to the reception of said acoustic signal by each of said receiver means respectively, said electromagnetic response signals being each respectively characteristic for each of said receiver means, receiving said electromagnetic response signals at said measuring station, supplying said response signals to time-delay measuring elements, deriving from said elements a first time-delay electric signal $\Delta T_x$ which is substantially proportional to the time-delay between the respective instants of reception of the two electromagnetic response signals which are respectively characteristic of the two receiver means of said first pair of receiver means, and a second time-delay signal $\Delta T_y$, which is substantially proportional to the time-delay between the respective instants of reception of the two electromagnetic response signals which are respectively characteristic of the two receiver means of said second pair of receiver means, and generating two coordinate electric signals X and Y, representing the coordinates of said mobile installation in the system formed by said two planes of reference, said two coordinate electric signals being respectively substantially proportional to $$X = KT_x$$
$$Y = K'T_y$$

wherein $$K = \frac{c}{2}\sqrt{\frac{h^2}{a^2}+1}, \quad K' = \frac{c}{2}\sqrt{\frac{h^2}{b^2}+1}$$

$c$ being the velocity of propagation of said acoustic signals in water, $h$ the water depth under the mobile installation, $a$ being one-half of the distance between the receiver means of said first pair and $b$ one-half of the distance between the receiver means of said second pair.

4. A method for the radio-acoustic location at sea of a mobile installation by a measuring station with respect to two stationary reference planes, by means of at least three submerged means for receiving acoustic signals, having substantially fixed locations with respect to the sea-bed and means, electrically connected with said receiver means, for transmitting electromagnetic signals in response to the reception of said acoustic signals by said receiver means, wherein a first of said reference planes is the symmetry plane of a first pair of said submerged means and the second of said reference planes is the symmetry plane of a second pair of said submerged means, said method comprising the steps of transmitting an acoustic signal from said mobile installation, actuating time-measuring elements at said measuring station, the time of actuation of said time-measuring elements corresponding to the time of transmission of said acoustic signal, receiving said acoustic signal at said receiver means, transmitting electromagnetic signals from said transmitting means in response to the reception of said acoustic signal by each of said receiver means respectively, said electromagnetic response signals being each respectively characteristic for each of said receiver means, receiving said electromagnetic response signals at said measuring station, applying said electromagnetic response signals to said time-measuring elements, deriving from said elements a first pair of electric signals $T_1$ and $T_3$ respectively proportional to the time intervals between said time of actuation of said time-measuring elements and the respective times of application to said elements of the electromagnetic response signals which are respectively characteristic of the two receiver means of said first pair of receiver means, deriving from said time-measuring elements a second pair of electric signals $T_2$ and $T_4$ respectively proportional to the time intervals between said time of actuation of said time-measuring elements and the respective times of application to said elements of the electromagnetic response signals which are respectively characteristic of the two receiver means of said second pair of receiver means, and generating two coordinate electric signals X and Y representing the coordinates of said mobile installation in the system formed by said two planes of reference, said two coordinate electric signals being respectively substantially proportional to $$X = \frac{c^2(T_1^2 - T_3^2)}{4a} \quad \text{and} \quad Y = \frac{c^2(T_2^2 - T_4^2)}{4b}$$

wherein $c$ is the velocity of propagation of said acoustic signals in water, $a$ is one-half of the distance between the receiver means of said first pair and $b$ is one-half of the distance between the receiver means of said second pair.

5. A method for radio-acoustic location at sea of the position of a mobile installation by a measuring station with respect to two axes of coordinates arbitrarily fixed in position passing through a position or origin by means of a ranging system comprising at least three immersed receiver means for acoustic signals, having substantially fixed positions with respect to the sea bed and means electrically connected with said receiver means for transmitting electromagnetic response signals in response to the reception of said acoustic signals by said receiver means, said method comprising the steps of transmitting a first acoustic signal from a first position of said mobile installation said first position being determined with respect to said two axes of coordinates, actuating time-measuring elements at said measuring station, the time of actuation of said time-measuring elements corresponding to the time of transmission of said acoustic signal, receiving said acoustic signal at said receiver means, transmitting electromagnetic signals from said transmitting means in response to the reception of said acoustic signal by each of said receiver means respectively, the number of said response signals being equal to the number of said receiver means and said response signals being respectively characteristic for each of said receiver means, receiving said response signals at said measuring station, applying said response signals to said time-measuring elements, deriving from said elements a first series of electric signals $T_{o1} \ldots T_{oi} \ldots T_{on}$, respectively proportional to the time intervals between said time of actuation of said time-measuring elements and the respective times of application to said elements of the electromagnetic response signals which are respectively characteristic for said receiver means, each electric signal thus corresponding to one of said receiver means, said first series of electric signals corresponding to said first acoustic signal, transmitting at least one other acoustic signal from at least one other position of said mobile installation, deriving another series of electric signals $T_1 \ldots T_i \ldots T_n$, corresponding to said other acoustic signal, generating displacement electric signals $T_1-T_{o1} \ldots T_i-T_{oi} \ldots T_n-T_{on}$, proportional to the differences between the electric signals of said two series corresponding to the same receiver means, and generating two coordinate electric signals X and Y being two linear functions of said displacement electric signals $$X = \sum_{i=1}^{n} \lambda_i (T_i - T_{0i})$$

$$Y = \sum_{i=1}^{n} \mu_i (T_i - {}_{0i})$$

wherein $n$ is the number of receiver means, and $\lambda_i$, $\mu_i$ coefficients depending upon the position of the receiver means, said two coordinate signals representing the coordinates of said other position of said mobile installation with respect to said two axes of coordinates.

References Cited

UNITED STATES PATENTS

| 2,910,665 | 10/1959 | Hawkins | 340— |
| 3,205,475 | 9/1965 | Foss | 340— |
| 3,213,410 | 10/1965 | Hagemann | 340— |
| 3,299,398 | 1/1967 | Hersey et al. | 340— |

OTHER REFERENCES

Ragland: Ocean Science and Ocean Eng., vol. 2, 1965 pp. 1145–1157.

RICHARD A. FARLEY, *Primary Examiner.*

U.S. Cl. X.R.

340—6

UNITED STATES PATENT OFFICE
CERTIFICATE OF CORRECTION

Patent No. 3,421,138                                      January 7, 1969

Pierre Moulin et al.

It is certified that error appears in the above identified patent and that said Letters Patent are hereby corrected as shown below:

Column 3, lines 12 and 13, "acousic" should read -- acoustic --; line 20, "using the respective times of reception of the" should read -- emitting the acoustic impulses provided that the --; line 43, "seat" should read -- sea --; line 66, "respecive" should read -- respective --. Column 5, line 25, "apieces" should read -- apices --. Column 6, line 74, cancel "a". Column 8, lines 57 and 58, "7a" and "6a" should read -- $7_a$ -- and -- $6_a$ --. Column 9, lines 11 to 13, the equation should appear as shown below:

$$p_1 = \frac{c}{2}\sqrt{\frac{h^2}{a^2}+1}$$

Column 11, lines 49 to 51, the equations should appear as shown below:

$$X = K\Delta Tx$$
$$Y = K\Delta Ty$$

Column 13, lines 12 to 14, the equation should appear as shown below:

$$Y = \sum_{i=1}^{n} \mu_i(T_i - T_{oi})$$

Signed and sealed this 17th day of March 1970.

(SEAL)
Attest:

EDWARD M. FLETCHER, JR.                      WILLIAM E. SCHUYLER, JR.
Attesting Officer                                    Commissioner of Patents